(12) United States Patent
Yang

(10) Patent No.: US 7,783,036 B2
(45) Date of Patent: Aug. 24, 2010

(54) APPARATUS FOR ENCRYPTING/DECRYPTING REAL-TIME INPUT STREAM

(75) Inventor: Yoon Seok Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 955 days.

(21) Appl. No.: 10/050,274

(22) Filed: Jan. 16, 2002

(65) Prior Publication Data

US 2002/0131588 A1 Sep. 19, 2002

(30) Foreign Application Priority Data

Jan. 17, 2001 (KR) .................. 2001-2644

(51) Int. Cl.
*H04K 1/00* (2006.01)
(52) U.S. Cl. ........................ 380/37; 380/217
(58) Field of Classification Search ............... 380/28, 380/217, 37; 713/168, 200, 171
See application file for complete search history.

(56) References Cited

U.S. PATENT DOCUMENTS

| | | | | |
|---|---|---|---|---|
| 4,255,811 A | * | 3/1981 | Adler | 380/37 |
| 5,420,866 A | * | 5/1995 | Wasilewski | 370/426 |
| 6,182,216 B1 | * | 1/2001 | Luyster | 713/168 |
| 6,212,281 B1 | * | 4/2001 | Vanstone | 380/282 |

2001/0010722 A1  8/2001 Enari

OTHER PUBLICATIONS

Mroczkowski, P., "Implementation of the block cipher Rijndael using Altera FPGA," May 2000.*
Daemen, J., "AES Proposal: Rijndael," Mar. 1999, pp. 1-28.*
Applied Cryptography, Bruce Schneier 1996 pp. 270-273, 277.*
The Rijndael Block Cipher—AES Proposal: Rijndael by Joan Daemen, Vincent Rijmen; Document version 2, Dated: Mar. 9, 1999; pp. 1-22.
Cipher Theory and Security: 2.2.1 Cipher and decipher of DES; pp. 1-5.

* cited by examiner

*Primary Examiner*—Christopher J Brown
(74) *Attorney, Agent, or Firm*—Birch, Stewart, Kolasch & Birch, LLP

(57) ABSTRACT

Disclosed is an apparatus for encrypting/decrypting a real-time input stream. The present invention includes a control unit, a key schedule unit, and a block round unit. Accordingly, the present invention realizes the encryption and decryption of AES algorithm in a manner of hardware, thereby enabling to carry out the encryption and decryption of the real-time input stream real-timely. And, the present invention finds the key for encryption or decryption of one block every round when realizing the encryption and decryption of the AES algorithm in a hardware manner, and then outputs the found keys to the block round unit. The present invention reduces the size of the key register required for the encryption/decryption of block data, thereby enabling to reduce a size of hardware as well as cost of product.

16 Claims, 3 Drawing Sheets

APPARATUS FOR ENCRYPTING/DECRYPTING REAL-TIME INPUT STREAM

CROSS REFERENCE TO RELATED ART

This application claims the benefit of Korean Patent Application No. 2001-2644, filed on Jan. 17, 2001, which is hereby incorporated by reference.

BACKGROUND OF THE INVENTION

1. Field of the Invention

The present invention relates to an apparatus for encrypting/decrypting a real-time input stream using AES (Advanced Encryption Standards) algorithm.

2. Background of the Related Art

As importance of pay information and privacy protection increases, so does that of encryption/decryption apparatuses. Specifically, the next generation encryption standards have been newly proposed so as to replace the DES (Data Encryption Standards) which has been the U.S. encryption standard.

NIST (National Institute of Standards and Technology) has evaluated 15 algorithms as AES candidate technologies for years, and has narrowed the candidates to 5 and has finally selected the Rijndael algorithm as the next generation encryption standards through a close investigation and set about details. NIST is going to open/examine/modify the Rijndael algorithm for a while so as to confirm it as the AES. The confirmed proposal will be selected as FIPS (Federal Information Processing Standards).

The AES as a block encryption algorithm (which carries out the encryption by gathering streams by block unit) replaces the previous encryption standards, DES, and will be used for protecting information of U.S. government and people. Allowance of exporting encryption devices by U.S. government will make the AES as encryption standards prevail throughout the world. DES selected as encryption standards by U.S. government in 1976 uses 56-bits encryption system, while AES uses three systems of 128, 192, and 256 bits so as to strengthen the encryption with such excellent advantages as performance, efficiency, flexibility, and easy embodiment.

Yet, the AES algorithm introduced by software fails to carry out encryption/decryption for a real-time input stream. Namely, for real-time operation, a block round should fulfill the calculation of all rounds before the next block data are transferred. However, the block round in the AES algorithm constructed with software fails to fulfill such operation. Thus, when consecutive data streams are inputted, the block round with software is unable to secure a time to perform a processing on data by preparing one block, thereby failing to carry out the real-time processing on the consecutive data streams.

SUMMARY OF THE INVENTION

Accordingly, the present invention is directed to an apparatus for encrypting/decrypting a real-time input stream that substantially obviates one or more problems due to limitations and disadvantages of the related art.

An object of the present invention is to provide an apparatus for encrypting/decrypting a real-time input stream enabling to encrypt and decrypt a real-time inputted stream real-timely by constructing Rijndael algorithm selected as AES algorithm with hardware.

Another object of the present invention is to provide an apparatus for encrypting/decrypting a real-time input stream enabling to carry out encryption and decryption with a simple hardware structure by sharing a block used in common when realizing hardware of Rijndael algorithm.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for encrypting/decrypting a real-time input stream according to the present invention includes a control unit receiving a real-time stream of byte units, converting the real-time stream into block data, and outputting the block data for encryption or decryption, the control unit receiving encrypted or decrypted block data, converting the received encrypted or decrypted block data into byte units, and outputting the converted block data of the byte units, a key schedule unit carrying out a key schedule every round in accordance with a size and a key value of a block inputted from outside so as to output a key value for the encryption or decryption each round, and a block round unit receiving the converted data of block units from the control unit, receiving the key value from the key schedule unit so as to carry out the encryption or decryption, and outputting the encrypted or decrypted result to the control unit.

Preferably, the control unit comprises an input buffer storing the real-time stream of byte units inputted from the outside and converting the received real-time stream into the block data having the size inputted from the outside so as to output the converted block data to the block round unit and an output buffer receiving the block data encrypted or decrypted in the block round unit and converting the received block data into the byte units so as to output the converted data.

More preferably, the block round unit completes all round calculation of data having been currently encrypted or decrypted before a next block data is inputted from the control unit and then stores the corresponding result in the output buffer of the control unit.

Preferably, the key schedule unit carries out every round the key schedule on a key required for the block round unit to process each round so as to output the key scheduled result to the block round unit.

More preferably, the key schedule unit includes a key expansion unit expanding the inputted key value into a size amounting to {block size*(count of rounds +1)} and a key selection unit selecting a 128 bits key required for each round from the expanded key value so as to output the selected key to the block round unit.

Preferably, the key schedule unit expands the inputted key value into a size of {block size*(count of rounds +1)} and then carries out a step of selecting the 128 bits key required for each round using one key register.

More preferably, the key schedule unit comprises the key register amounting to the key value required substantially for one round.

More preferably, the key register has a capacity amounting to {(size of an inputted block)*(size of one round)}.

Preferably, the control unit generates a control signal to produce the key value every round and then outputs the control signal to the key schedule unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
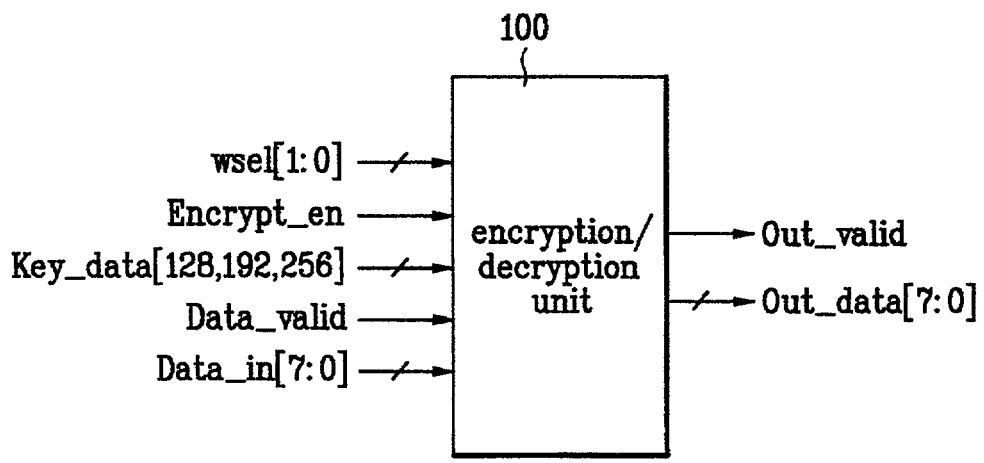
FIG. 1 illustrates a schematic block diagram of an encryption/decryption apparatus of a real-time input stream according to a preferred embodiment of the present invention.
Figure 2:
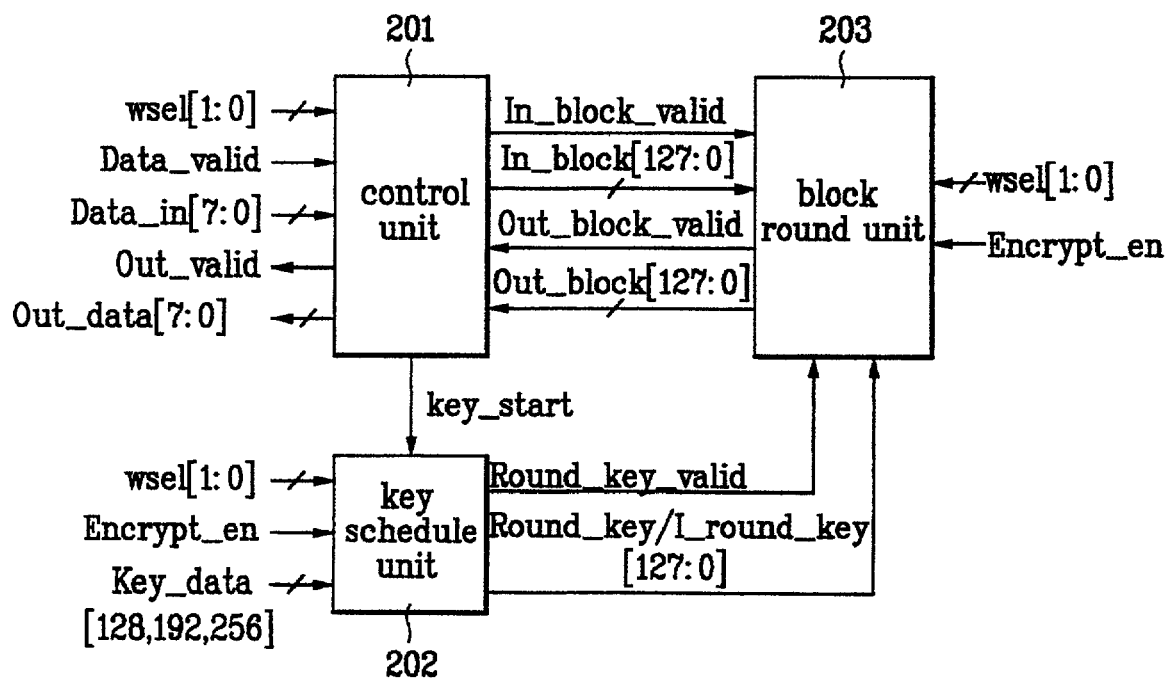
FIG. 2 illustrates a detailed block diagram of an encryption/decryption apparatus of a real-time input stream according to the preferred embodiment of the present invention.

FIG. 1 illustrates a schematic block diagram of an encryption/decryption apparatus of a real-time input stream according to the present invention, in which input/output signals are shown exemplarily. FIG. 2 illustrates a detailed block diagram of an encryption/decryption apparatus of a real-time input stream according to the preferred embodiment of the present invention.

Referring to FIG. 2, an AES encryption/decryption apparatus according to the present invention includes a key schedule unit 202 receiving 128/192/256 bit keys so as to be in charge of a key schedule, a block round unit 203 receiving 128 block data so as to carry out encryption/decryption, and a control unit 201, such as a processor, generating control signals required for the key schedule unit 202 and the block round unit 203 and receiving to convert a stream of a byte unit into that of a block unit through an input buffer to output the converted stream to the block round unit 203 or converting block data outputted from the block round unit 203 into byte units so as to output the converted byte units externally.

In this case, signals preferably inputted to the control unit 201 include stream data (MPEG system stream, DSS stream, and the like) Data_in[7:0] for encryption or decryption of byte units, data valid signal Data_valid, wsel[1:0] signal informing a size of a key value, block data Out_block[127:0] encrypted or decrypted in the block round unit 203, and encrypted or decrypted block data valid signal Out_block_valid.

And, signals preferably outputted from the control unit 201 include byte-united stream data Out_data[7:0] encrypted or decrypted through the key schedule unit 202 and the block round unit 203, output data valid signal Out_valid, block data In_block[127:0] outputted to the block round unit 203 for encryption and decryption, block data valid signal In_block_valid for encryption and decryption, and key schedule start control signal Key_start outputted to the key schedule unit 202.

Signals inputted to the key schedule unit 202 include wsel [1:0] signal informing a size of a key value, Encrypt_en signal informing whether to encrypt or decrypt, Key_data[128,192, 256], and Key_start signal outputted from the control unit 201. And, signals outputted from the key schedule unit 202 include key data Round_key/I_round_key[127:0] and key data valid signal Round_key_valid.

Signals inputted to the block round unit 203 include wsel [1:0] informing a size of a key value, Encrypt_en signal informing whether to be encrypt or decrypt, block data In_block[127:0] outputted from the control unit 201 for encryption and decryption, the block data valid signal In_block_valid, key data outputted from the key schedule unit 202 for encryption and decryption, and key data valid signal Round_key_valid. And, signals outputted from the block round unit 203 include encrypted or decrypted block data Out_block[127:0] and the block data valid signal Out_block_valid.

In this case, the plain text, i.e. block data inputted for encryption, is preferably fixed to 128. Namely, the plain text is the block data becoming the target of encryption. The wsel signal values in accordance with the plain text and key value are illustratively shown in Table 1. Alternatively, other values may be assigned as the size of the plain text or key value without deviating from the gist of the present invention.

TABLE 1

| wsel [1:0] | Plain text = 128 |
| --- | --- |
| key value = 128 | 00 |
| Key value = 192 | 01 |
| Key value = 256 | 10 |

For instance, assuming that the inputted wsel[1:0] signal is '01', the plain text to be encrypted, i.e. a size of a block, is 128. In this case, the key value means '192'. And, such a wsel[1:0] signal is inputted to the control unit 201, key schedule unit 202, and block round unit 203, simultaneously.

Figure 3:
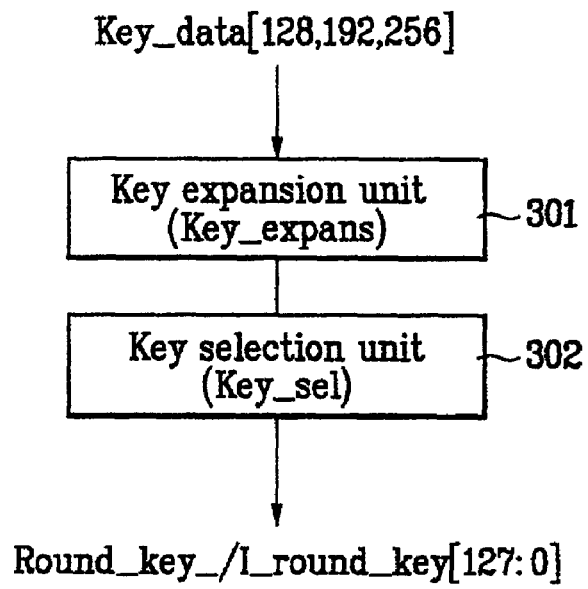
FIG. 3 illustrates a detailed block diagram of a key schedule unit in FIG. 2.

FIG. 3 illustrates a detailed block diagram of a key scheduling unit in FIG. 2.

Referring to FIG. 3, the key schedule unit 202 preferably comprises a key expansion unit 301 and a key selection unit 302.

A size of the key value is determined by the wsel signal, as shown in Table 1, and inputted to the key expansion unit 301. The key expansion unit 301 then expands the inputted key value into a size corresponding to {a block size*(account of rounds+1)} through a key expansion process key_expans. Each of the expanded keys is inputted to the block round unit 203 through the key selection unit 302 every round or period (or a predetermined period) so as to carry out encryption/decryption, i.e. cipher/decipher Rijndael algorithm. Preferably, the key selection unit 302 selects a 128 bit key required for each round so as to output the selected key to the block round unit 203. This is because each round needs the key value when the block round unit 203 carries out the encryption or decryption.

Preferably, the key schedule unit 202 finds a key for encrypting or decrypting each round so as to output the found key to the block round unit 203. If an encryption process is currently carried out, the selection unit 302 generates to output the key value Round_key[127:0] required for each round selectively. If a decryption process is currently carried out, the key selection unit 302 carries out an inverse operation by receiving a final 128 bit key value found previously through a decryption key schedule in an initial process so as to generate a key value required for each round.

In this case, if the expanded key is previously stored instead of finding the key for encryption or decryption of one block every round, a register amounting to {block size*(count of rounds+1)} is required. For instance, if the block size is 128 bits and a size of the key value is 256 bits, a count of rounds becomes '14'. Hence, a required size of the register is {128*(14+1)} bits=1920 bits=240 bytes. For another instance, if the block size is 128 bits and a size of the key value is 128 bits, a count of rounds becomes '10'. Hence, a required size of the register is {128*(10+1)} bits=1408 bits=176 bytes.

Namely, if the register is constructed so as to have all of the key value(block size*count of rounds) expanded by key schedule, the register should have excessively large capacity. This wastes memory size and processing time.

In order to prevent such an unnecessary waste, the present invention finds the key for encryption or decryption of one block every round so as to output the found key to the block round unit 203. Hence, the register having the key value only required for a round is necessary.

For instance, if the block size is 128 bits and a size of the key value is 256 bits, the register needs a value of (block size*value for one round). Hence, the required size of the register is 128*1=16 bytes.

The encryption/decryption apparatus according to the present invention carries out the encryption/decryption operation by key-scheduling each round in order to reduce the size of the register. And, the present invention enables to carry out both of the encryption and decryption using the encrypt_en signal and the key schedule unit 202 only.

Figure 4:
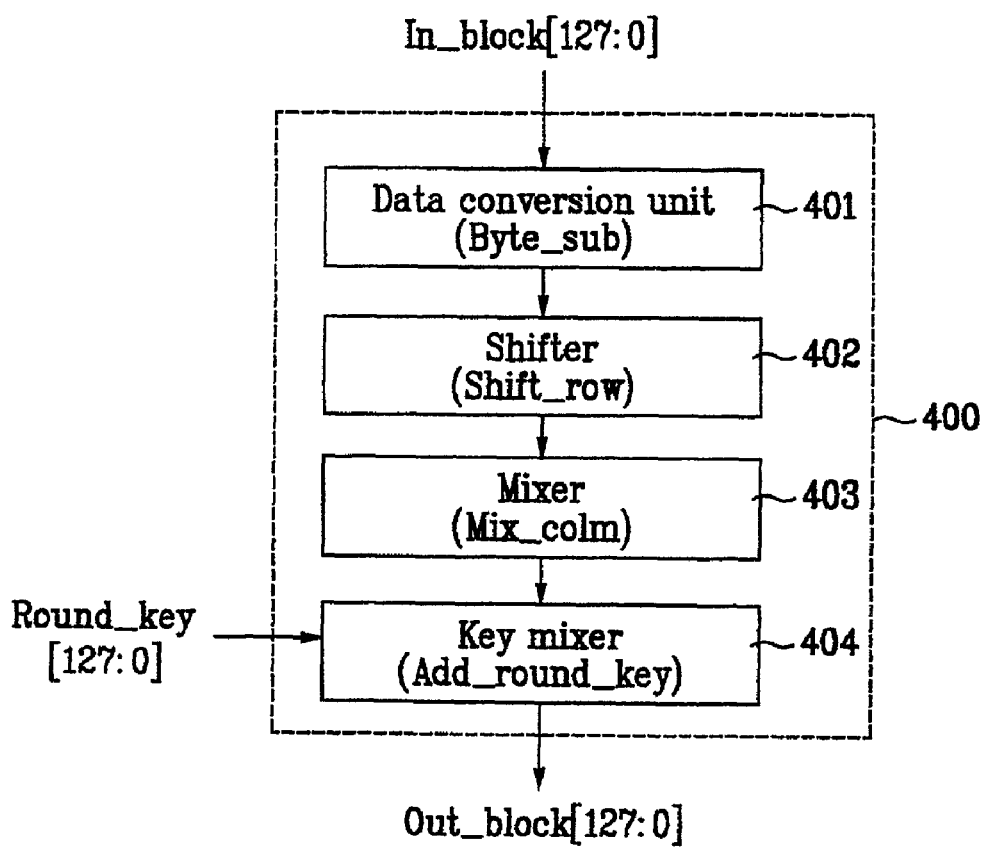
FIG. 4 illustrates a detailed block diagram of an encryption unit of a block round unit in FIG. 2.
Figure 5:
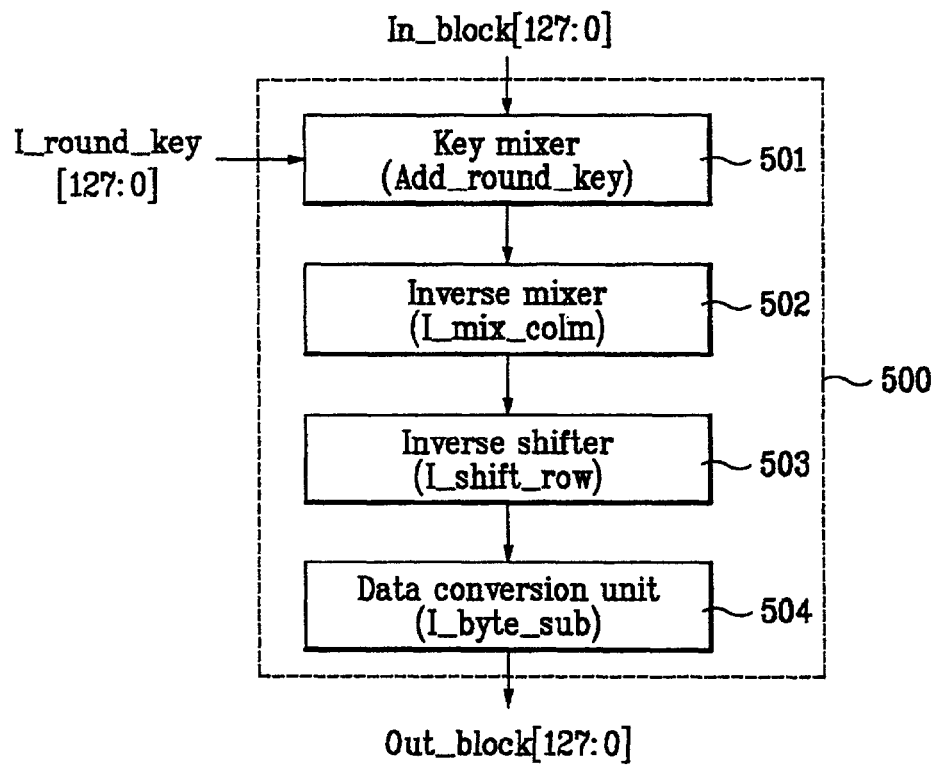
FIG. 5 illustrates a detailed block diagram of a decryption unit of a block round unit in FIG. 2.

FIG. 4 illustrates a detailed block diagram of an encryption unit of the block round unit 203 in FIG. 2, and FIG. 5 illustrates a detailed block diagram of a decryption unit 500 of the block round unit in FIG. 2.

Namely, the block round unit 203 carries out the encryption/decryption operation using the block data In_block[127:0] and valid signal In_block_valid provided by the input buffer of the control unit 201.

In this case, the encryption/decryption key required for each round is inputted from the key schedule unit 202. Moreover, the block round unit 203 carries out the calculation of all rounds before the next block data is transferred from the control unit 201. This is because the hardware structure that the control unit 201, key schedule unit 202, and block round unit 203 are preferably constructed with logic gates so as to enable a real-time processing. Alternatively, other programmable logic devices or software processing known to one of ordinary in the art may also be substituted.

In this case, the encryption/decryption key required for each round is inputted from the key schedule unit 202. Moreover, the block round unit 203 carries out the calculation of all rounds before the next block data is transferred from the control unit 201. This is because the hardware structure that the control unit 201, key schedule unit 202, and block round unit 203 are preferably constructed with logic gates so as to enable a real-time processing. Alternatively, other programmable logic devices known to one of ordinary in the art may also be substituted.

The data substituted by byte units in the data conversion unit 401 is inputted to a shifter 402 to be shifted in a row direction, inputted to a mixer 403 so as to be mixed in a column direction, inputted to a key mixer 404 so as to be combined with the round key Round_key[127:0] outputted from the key schedule unit 202, and outputted to the control unit 201, successively. Namely, the inputted block data passes through the data conversion unit 401, shifter 402, mixer 403, and key mixer 404 sequentially so as to complete one round. And, the above steps are repeated in accordance with a count of the previous setup rounds. In this case, the count of the repeated rounds is determined by the key value.

If the decryption is being carried out, the encryption in FIG. 4 is carried out in reverse. The reverse process is shown in FIG. 5.

Namely, when the block data In_block[127:0] is inputted from the control unit 201 for decryption, the key mixer 501 adds the block data In_block[127:0] to the inverse round key I_round_key outputted from the key schedule unit 202 so as to output the added result to an inverse mixer 502. The inverse mixer 502 mixes inversely the data outputted from the key mixer 501 in a column direction, and then outputs the result to an inverse shifter 503 so as to carry out inverse shift in a row direction. This is because the mixing is carried out in the column direction for encryption as well as the shift is carried out in the row direction. Thus, the process for decryption is carried out in a reverse manner of the encryption. Data outputted from the inverse shifter 503 is outputted to the control unit 201 through a data conversion unit 504.

Thus, the block data Out_block[127:0], which is encrypted in the encryption unit 400 of the block round unit 203 or decrypted in the decryption unit 500, is transferred to an output buffer in the control unit 201 with the block data output valid signal Out_block_valid.

Figure 6:
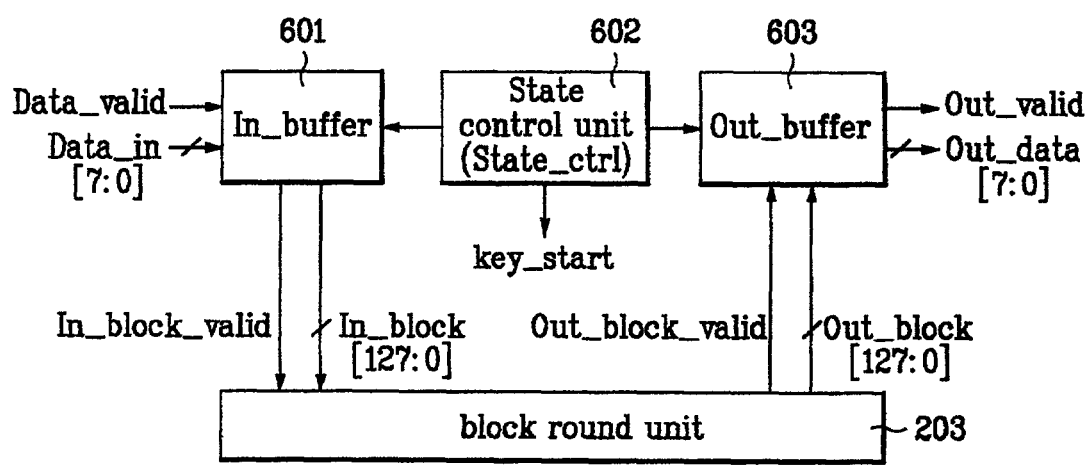
FIG. 6 illustrates a detailed block diagram of a control unit in FIG. 2.

FIG. 6 illustrates a detailed block diagram of the control unit 201 in FIG. 2.

Referring to FIG. 6, the control unit 201 includes an input buffer 601 receiving to convert a bit stream to be encrypted or decrypted into block units and then outputting the converted block data In_block[127:0] and the block data valid signal In_block_valid to the block round unit 203, an output buffer 603 receiving the encrypted or decrypted data Out_block[127:0] from the block round unit 203 and the data valid signal Out_block_valid in byte unit, and a state control unit 602 controlling data storage and output of the input/output buffers 601 and 603 and generating the control signal key_start to generate the key value of each round so as to output the generated signal key_start to the key schedule unit 202.

Preferably, the input buffer 601 of the control unit 201 stores the bit stream Data_in[7:0] inputted for encryption or decryption in byte unit therein. When the stored bit streams Data_in[7:0] are accumulated as much as a size of one block, the input buffer 601 outputs the accumulated data streams to the block round unit 203 in block unit. The state control unit 602 controls the data storage and output of the input/output buffers 601 and 603 as well as generates to output the control signal key_start to the key schedule unit 202 so as to generate the key value for each round. And, the output buffer 603 receives to store the encrypted or decrypted data from the block round unit 203 so as to output the data Out_data[7:0] of byte units with the valid signal Out_valid.

Accordingly, the apparatus of encrypting/decrypting a real-time input stream according to the present invention realizes the encryption and decryption of the AES algorithm in a manner of hardware, thereby enabling to carry out the encryption and decryption of the input data stream in real time.

Moreover, the present invention is applicable to all information encryption devices requiring real-time encryption, and specifically, to pay stream encryption for a receive-restricting system and private information encryption, and the like.

Furthermore, the present invention finds the key for encryption or decryption of one block every round when realizing the encryption and decryption of the AES algorithm in a hardware manner, and then outputs the found keys to the block round unit. Therefore, the present invention reduces the size of the key register required for the encryption/decryption of block data to maximum 1/15 to minimum 1/10 times less than that of the related art, thereby enabling to reduce a size of hardware as well as cost of product.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for encrypting/decrypting a real-time input stream, comprising:
    a processor configured to receive a data stream of bytes wherein the data stream is an MPEG data stream or a Digital Satellite Service (DSS) data stream, convert the data stream into data blocks, provide the data blocks for encryption or decryption, receive encrypted or decrypted data blocks, convert the received encrypted or decrypted data blocks into bytes, and output the bytes, wherein the processor generates a start key signal when a new round key is needed for every round;
    a key schedule unit configured to provide a round key for every round in accordance with the start key signal and an input key having a variable size to provide the round key for the encryption or decryption for each round, wherein the input key size is one of 128, 192, and 256 bits; and
    a block round unit configured to receive converted data blocks from the processor, receive the round key from the key schedule unit, encrypt or decrypt the received data blocks, and provide the encrypted or decrypted data blocks to the processor,
    wherein the key schedule unit selects a 128 bit round key to the block round unit for each round using a key register having a capacity of {(size of an inputted block)*(size of one round)}, and the key schedule unit provides the round key to the block round unit for each round without storing expanded keys being generated by the key schedule unit.

2. The apparatus of claim 1, wherein the processor comprises:
    an input buffer configured to store the data stream of bytes and convert the received data stream into the data blocks having a predetermined size so as to output the converted data blocks to the block round unit; and
    an output buffer configured to receive the data blocks encrypted or decrypted in the block round unit and convert the received data blocks into bytes so as to output a converted data.

3. The apparatus of claim 2, wherein the block round unit completes all round calculation of data having been currently encrypted or decrypted before a next data block is inputted from the processor and then stores the corresponding result in the output buffer of the processor.

4. The apparatus of claim 1, wherein the key schedule unit comprises:
    a key expansion unit configured to expand the inputted key value into a size amounting to {block size*(count of rounds +1)}; and
    a key selection unit configured to select the 128 bit key required for each round from the expanded key value so as to provide the selected key to the block round unit.

5. The apparatus of claim 1, wherein the processor generates a control signal to produce the selected 128 bit round key every round and then outputs the control signal to the key schedule unit.

6. An apparatus for encrypting/decrypting a real-time input data stream wherein the data stream is an MPEG data stream or a Digital Satellite Service (DSS) data stream, comprising:
    a processor configured to receive a data stream in first data format, convert the data stream and output data in a second data format for encryption or decryption, wherein the processor generates a start key signal when a new round key is needed for every round;
    a key schedule unit in communication with the processor and configured to provide a round key for every round in response to the start key signal and an input key having a variable size for the encryption or decryption for each round, wherein the input key size is one of 128, 192, and 256 bits; and
    a block round unit in communication with the processor and the key schedule unit and configured to receive converted data in second data format from the processor, receive the round key value from the key schedule unit for encryption or decryption of each round, and provide the encrypted or decrypted result to the processor,
    wherein the key schedule unit expands the input key into a size of {second data format size*(count of rounds +1)}, selects an N bit key required for each round from the expanded key value, and provides the selected N bit key to the block round unit for each round, and the key schedule unit selects a 128 bit round key to the block round unit for each round using a key register having a capacity of {(size of an inputted block)*(size of one round)}, and the key schedule unit provides the round key to the block round unit for each round without storing expanded keys being generated by the key schedule unit.

7. The apparatus of claim 6, wherein the first data format is in bytes, and the second data format is a data block.

8. The apparatus of claim 6, wherein the processor comprises:
    an input buffer configured to store the data stream of the first data format and convert the received data stream into the data of the second data format having a predetermined size; and
    an output buffer configured to receive data in the second data format and convert the data into the first data format.

9. The apparatus of claim 8, wherein the block round unit substantially completes all data encryption or decryption processing before a next set of data is inputted from the processor and stores the corresponding result in the output buffer of the processor.

10. The apparatus of claim 6, wherein the N bit key is equal to the 128 bit round key.

11. The apparatus of claim 6, wherein the processor generates a control signal to produce the round key in every round.

12. A real-time encryption/decryption apparatus, comprising:
    a processor configured to receive a data stream in first data format wherein the data stream is an MPEG data stream or a Digital Satellite Service (DSS) data stream, convert the data stream and output data in a second data format for encryption or decryption, wherein the processor generates a start key signal when a new round key is needed for every round;

a key schedule unit in communication with the processor and configured to provide a round key in a predetermined period in response to the start key signal and an input key having a variable size, wherein the input key size is one of 128, 192, and 256 bits, and the key schedule unit has a key register capable of processing the input key required for the predetermined period; and a block round unit in communication with the processor and the key schedule unit and configured to receive converted data in second data format from the processor, and receive the round key from the key schedule unit for encryption or decryption of each round, wherein a size of the key register is no less than {(second data format size)*(size of one period)}, and the key schedule unit provides the round key to the block round unit for each round without storing expanded keys being generated by the key schedule unit.

13. The apparatus of claim 12, wherein the first data format is in bytes, and the second data format is a data block.

14. A method of controlling a data protection key, the method being processed in an encryption apparatus, comprising:

generating a new data protection key according to a start key signal, the start key signal generated when a generation of the new data protection key is needed in the encryption apparatus, the new data protection key generated according to a predetermined period, wherein the new data protection key is generated through an intermediate value, and the intermediate value is not stored; and encrypting data corresponding to the period with the new data protection key in the encryption apparatus.

15. The method of claim 14, further comprising a data key valid signal provided with the new data key for encryption or decryption.

16. The method of claim 14, wherein the data are encrypted according to the start key signal in real time.

* * * * *